C. JACKMAN.
Running-Gears.

No. 153,960. Patented Aug. 11, 1874.

WITNESSES:

INVENTOR:
Jackman
BY
ATTORNEYS.

UNITED STATES PATENT OFFICE.

CELESTIN JACKMAN, OF GEORGIA CITY, MISSOURI.

IMPROVEMENT IN RUNNING-GEARS.

Specification forming part of Letters Patent No. 153,960, dated August 11, 1874; application filed June 27, 1874.

*To all whom it may concern:*

Figure 1:
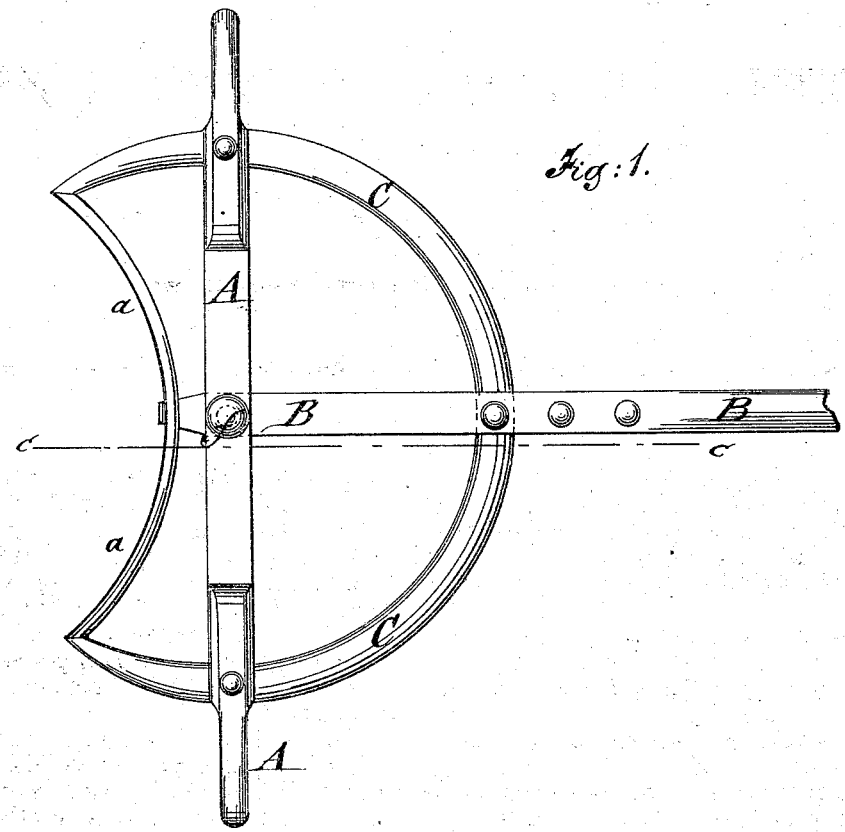
Figure 2:
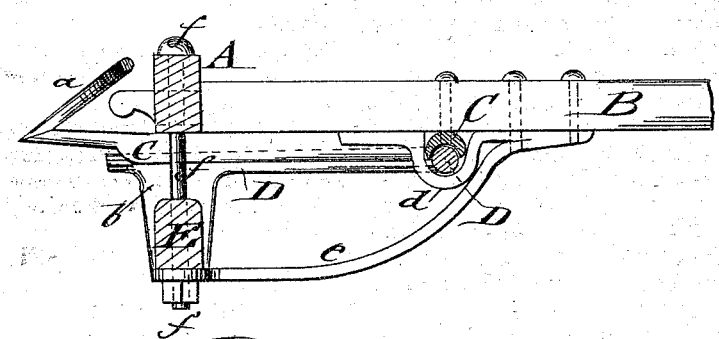

Be it known that I, CELESTIN JACKMAN, of Georgia City, Jasper county, Missouri, have invented a new and useful Improvement in Wagons, of which the following is a specification:

In the accompanying drawing, Figure 1 represents a top view of my improvement. Fig. 2 is a vertical longitudinal section of the same on the line $c\,c$, Fig. 1.

Similar letters of reference indicate corresponding parts.

The object of my invention is to so improve the coupling and fifth-wheel of wagons, carriages, and buggies, and other vehicles supported on springs, that greater security in the coupling of the parts is obtained and less friction produced, as the accumulation of grit, dust, &c., is prevented.

The invention consists of the connection of the bolster or sway-bar, by a concave wheel or circle, with a convex follower and a pivoted brace attached to the front axle and the pole.

In the drawing, A represents the bolster or sway-bar, to which is centrally attached the pole or tongue B. A concave wheel, C, of semicircular shape, is firmly bolted to the under side of sway-bar and pole, equidistant from the connection of pole and bolster, the ends being extended back of the bolster A, and laterally connected by a curved and inclined brace-bar, $a$. The concave wheel C embraces and slides on a convex follower, D, which corresponds exactly in shape to the wheel, and is applied rigidly, by extension-clips $b$, to the front axle E, so that the pole and bolster may readily swing thereon to an angle of nearly ninety degrees in either direction from the longitudinal axis of the wagon. A guide-band, $d$, is firmly bolted to the pole around the wheel C and follower D, and pole B furthermore braced by stiffening-brace rod $e$, pivoted to the king-bolt $f$ at the under side of the front axle E.

The king-bolt $f$ forms the connection of axle and bolster, and may, in smaller wagons, be entirely dispensed with, while, in heavier wagons, the same forms, in connection with the sliding wheel and follower, perfect security of the king-bolt coupling.

As the grit and dust are kept out of the wheel and follower by their sliding action, the friction or cutting is considerably less, and thus, besides the stronger connection of the parts, a more readily operated fifth-wheel obtained.

Having thus described my invention, I claim as new and desire to secure by Letters Patent—

The combination of the bolster and rigidly-connected pole, a semicircular concave wheel, convex follower, and pivoted pole-brace with the front axle, substantially as and for the purpose set forth.

CELESTIN JACKMAN.

Witnesses:
JOHN C. GUINN,
WM. McCULLY.